United States Patent [19]
Wilson

[11] Patent Number: 5,650,871
[45] Date of Patent: Jul. 22, 1997

[54] SINGLE ELEMENT OPTICS FOR PASSIVE FACET TRACKING

[75] Inventor: James M. Wilson, Glendora, Calif.

[73] Assignee: Xerox Corporation, Stamford, Conn.

[21] Appl. No.: 641,605

[22] Filed: May 1, 1996

[51] Int. Cl.[6] .................................................. G02B 26/08
[52] U.S. Cl. ........................... 359/216; 359/203; 359/208; 359/217; 347/259; 347/261
[58] Field of Search .................................... 359/201, 203, 359/205, 207, 208, 216–219, 569, 572, 868, 869; 347/256–261

[56] References Cited

U.S. PATENT DOCUMENTS

| | | | |
|---|---|---|---|
| 3,973,826 | 8/1976 | Lobb | 359/217 |
| 4,846,552 | 7/1989 | Veldkamp et al. | 359/569 |
| 5,475,524 | 12/1995 | Harris | 359/216 |

*Primary Examiner*—James Phan
*Attorney, Agent, or Firm*—William Propp

[57] ABSTRACT

A double bounce passive facet tracking system uses a single passive optical component of a toroidal mirror to induce a beam of light to track a facet of a dual mirror rotating polygon. A beam focused in both the tangential and sagittal planes is reflected from a convex facet of the polygon mirror to the toroidal mirror. The toroidal mirror collimates the light beam in a tangential plane and focuses the beam in the sagittal plane so that the beam is collimated in the tangential plane and focussed in the sagittal plane when it reaches the flat facet of the polygon mirror.

8 Claims, 6 Drawing Sheets

SINGLE ELEMENT OPTICS FOR PASSIVE FACET TRACKING

BACKGROUND OF THE INVENTION

This invention relates to a passive facet tracking optical scanning system employing a rotating polygon mirror and, more particularly, to single element optics for a double bounce passive facet tracking optical scanning system.

FIG. 1 shows a prior art raster output scanning system utilizing a rotating polygon mirror for scanning. A light source 10, such as a laser, emits a coherent light beam 12. The light beam 12 passes through the pre-polygon optics 14 and reflects off the rotating polygon mirror 16 with flat reflecting facets 18. As the mirror 16 rotates, the beam 12 is scanned along a scan line on a photoreceptor 22. The direction along the scan line 20 is the tangential plane and the direction perpendicular to the scan line on the photoreceptor 22 is the sagittal plane.

Optical scanner performance is determined by the physical limitations on the speed at which the mirror is rotated, by the angular deflection of the laser beam achieved by reflection from a facet from the rotating polygon, the number of facets, the size of the facets, and the width of the beam being scanned where it is incident on the rotating mirror.

The beam width impacts the scanning speed because it determines the minimum facet size of a facet on the rotating mirror. A larger facet means a larger rotating polygon and hence larger, more costly motor polygon assemblies with higher power motors and/or slower scanning speeds. Scanning speeds, for a given beam width, can be increased by the use of facet tracking devices because they allow a smaller facet to be used and therefore smaller rotating mirrors which can be rotated faster.

Facet tracking devices are known in the art as in U.S. Pat. No. 3,973,826 by Lobb. Lobb describes a passive facet tracking system utilizing a prescanner which, as it rotates with the scanner, produces a variable deflection in the scanned beam so that during a scan period, the beam moves at the speed of a scanner and in the same direction. The prescanner, by slightly deflecting the beam at the speed of the scanner and in the same direction, maintains the position of the beam centered in the scanning facet. Specifically, a beam which is focused on a prescanner is reflected off the prescanner to a concave mirror which causes the beam to converge but not focus on a facet of the scanner. The prescanner is built using cylindrical or curved facets and the scanner is built using flat facets.

In the Lobb patent, the beam is not collimated at the scanner facet in the tangential plane, thus any variation in radius between the facets will translate into scanning errors on the scan line. In a laser printing application using the optical scanner, these scanning errors show up as pixel placement errors visible on a printed page. When the scanned beam is collimated in the scanned plane at the scanner facet, polygon manufacturing tolerances can be relaxed with resultant cost savings.

In the Lobb patent, the beam is not focused on the scanner facet in the sagittal plane. As a consequence, pyramidal errors in the scanner facet and bearing wobble will result in variable spacing between scan lines. In a laser printing application, these errors show up on the printed page as differences in spacing between the printed lines. Even very small differences are apparent, producing unacceptable output quality. When the beam is focused on the scanner facet in the sagittal plane, the effects of pyramidal errors and bearing wobble may be optically removed by focussing the facet as well as the beam from the facet onto the scan line. Again, this allows polygon manufacturing tolerances to be relaxed with resultant cost savings and no loss in print quality.

U.S. Pat. No. 5,559,627, commonly assigned as the present application and herein incorporated by reference, uses the anamorphic optics of a spherical lens and a retroreflector to collimate and focus the beam in the planes at the scanning facet so that errors produced by radial and pyramidal variations of the scanning facets may be substantially reduced or easily corrected to provide for improved scanning. U.S. Pat. No. 5,475,524, commonly assigned as the present application and herein incorporated by reference, uses a triplet anamorphic lens and a curved cylindrical mirror to collimate and focus the beam in the planes at the scanning facet.

It is an object of this invention to provide single element optics for a passive facet tracking optical scanning system.

SUMMARY OF THE INVENTION

In accordance with the present invention, there is provided a double bounce passive facet tracking system using a single passive optical component of a toroidal mirror to induce a beam of light to track a facet of a rotating mirror polygon. The properties of the toroidal mirror are such that the output light beam from the rotating polygon mirror is focussed at the facet in the sagittal plane, collimated in the tangential plane, and normal to the rotation axis of the polygon mirror.

Other objects and attainments together with a fuller understanding of the invention will become apparent and appreciated by referring to the following description and claims taken in conjunction with the accompanying drawings.

DETAILED DESCRIPTION OF THE INVENTION

Figure 1:
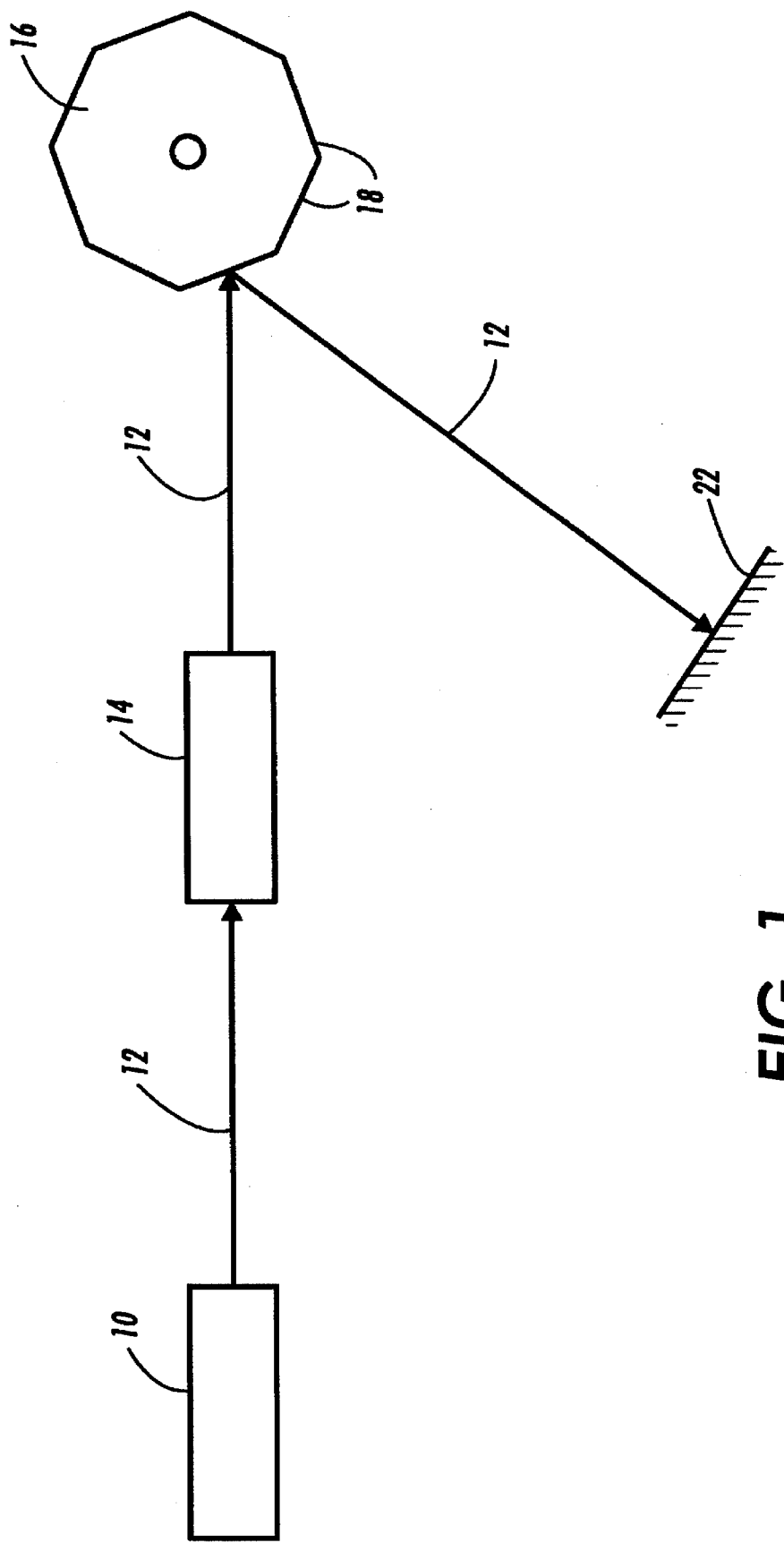
FIG. 1 is a schematic illustration of the cross-section side view of a prior art optical scanning system utilizing a rotating polygon mirror for scanning.
Figure 2:
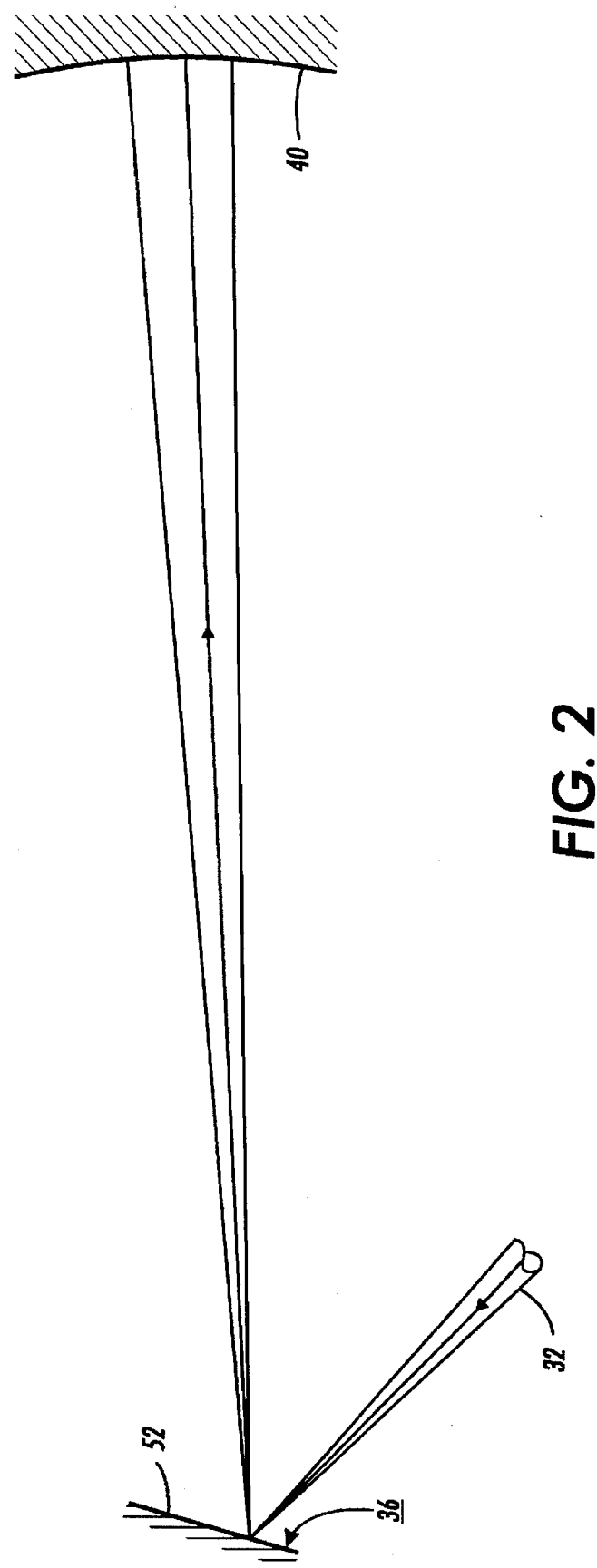
FIG. 2 is a schematic illustration of a cross-section side view in the tangential plane of the single element optics for the passive facet tracking system formed according to the present invention.

Reference is now made to FIG. 2, wherein there is illustrated a tangential plane partial layout of a passive facet tracking system. A beam 32 is directed towards and focussed on a dual mirror motor polygon assembly 36. The dual mirror motor polygon assembly 36 is shown in a perspective view in FIG. 4. The dual mirror motor polygon assembly 36 reflects the beam 32 to the single element passive facet tracking optics of a toroidal mirror 40 (FIG. 2) which is concave in the tangential plane and concave in the sagittal plane.

Figure 3:
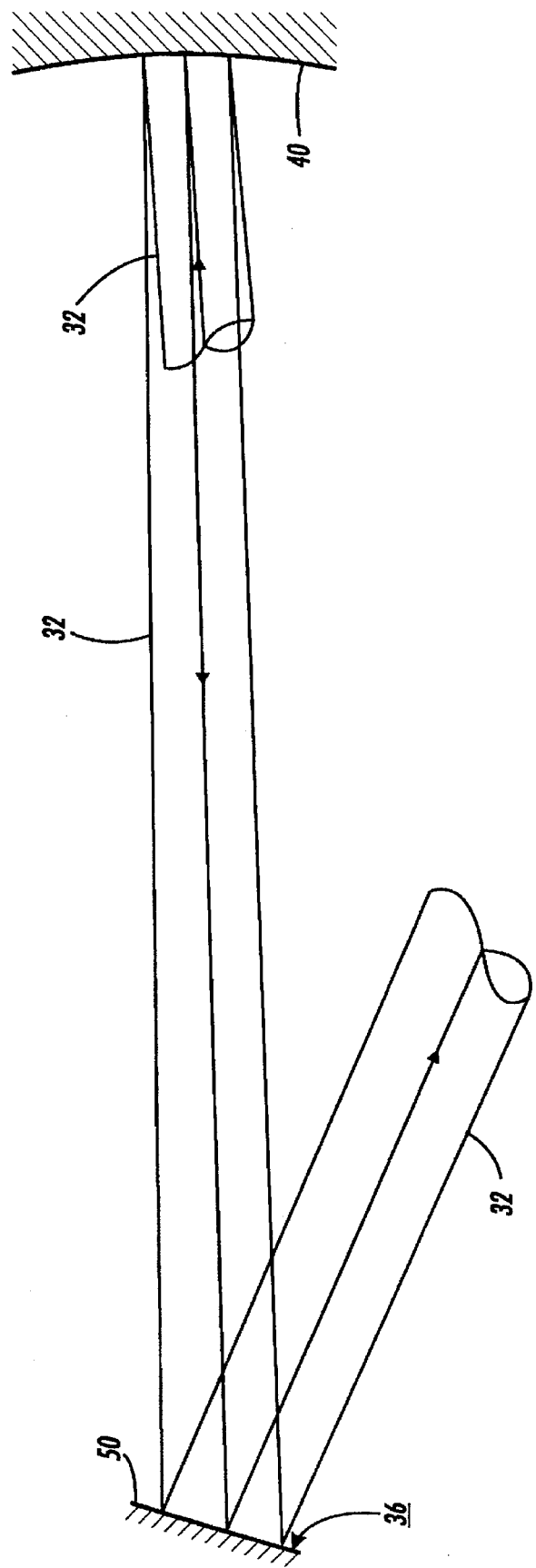
FIG. 3 is a continuation of the single element optics for the passive facet tracking system shown in FIG. 2.

As shown in FIG. 3, the toroidal mirror 40 reflects the beam 32 back to the dual mirror motor polygon assembly 36. The dual mirror motor polygon assembly 36 then reflects the beam 32 at an angle normal to the axis of rotation of the dual mirror motor polygon assembly towards post scanning optics and a photoreceptor (not shown).

Figure 4:
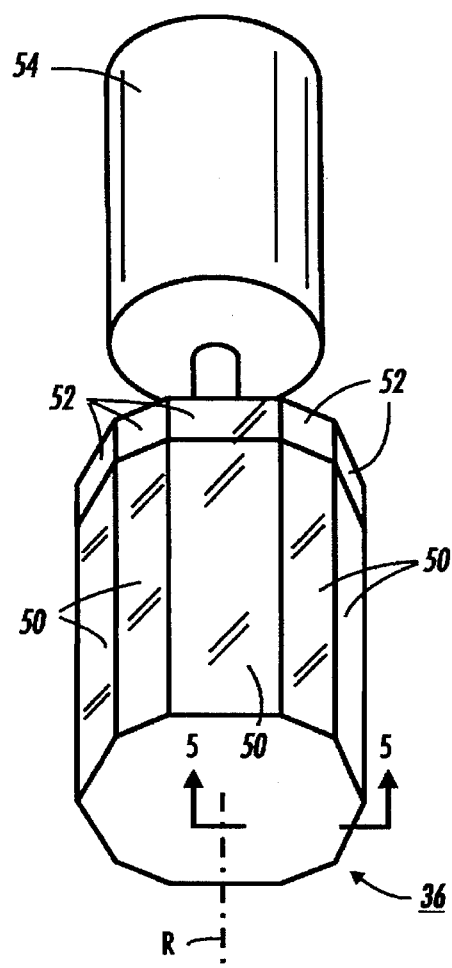
FIG. 4 is a schematic illustration of a perspective view of a dual mirror motor polygon assembly.
Figure 5:
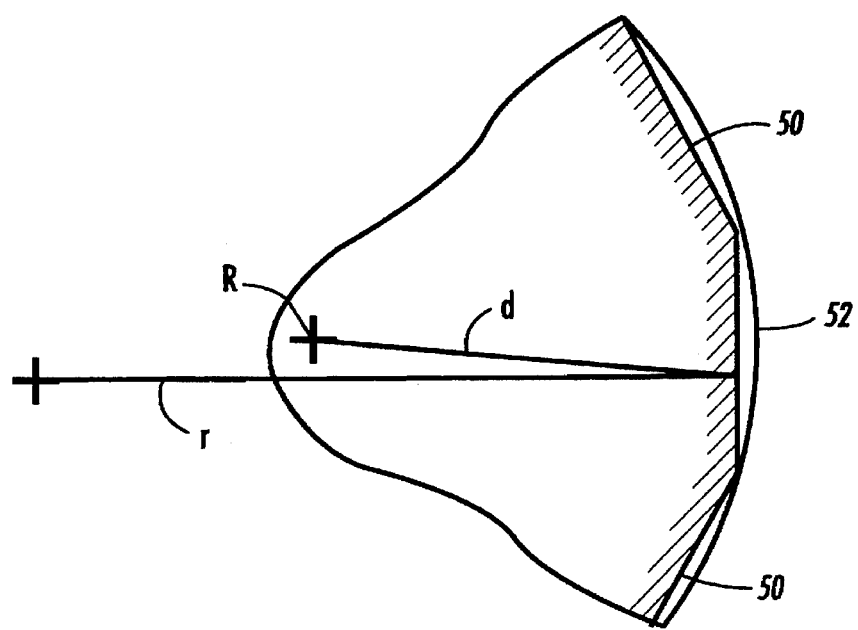
FIG. 5 is a schematic illustration of a cross-section side view of the dual mirror motor polygon assembly of FIG. 4.

The dual mirror motor polygon assembly 36, is shown in a perspective view in FIG. 4, includes flat facets 50 and convex facets 52 and is rotated along axis R by its motor 54. Axis R is the center of the polygon 36 and is located a distance d from the center of each flat facet 50. The convex facets 52 are curved facets, each convex facet 52 with a radius r just slightly larger than distance d of the polygon 36 as is shown in FIG. 5.

The single toroidal mirror passive facet tracking optics 40 is designed to provide different functions in the sagittal and tangential planes. These different functions are illustrated in FIGS. 2, 3, 6 and 7.

Figure 6:
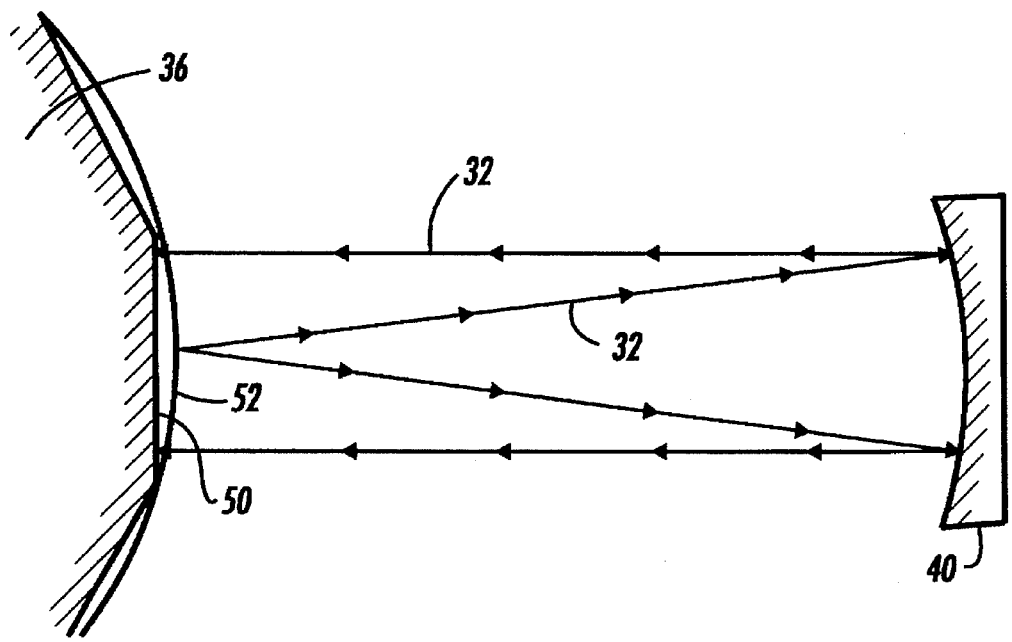
FIG. 6 is a schematic illustration of a cross-section side view in the tangential plane of the single element optics for the passive facet tracking system of FIG. 2.
Figure 7:
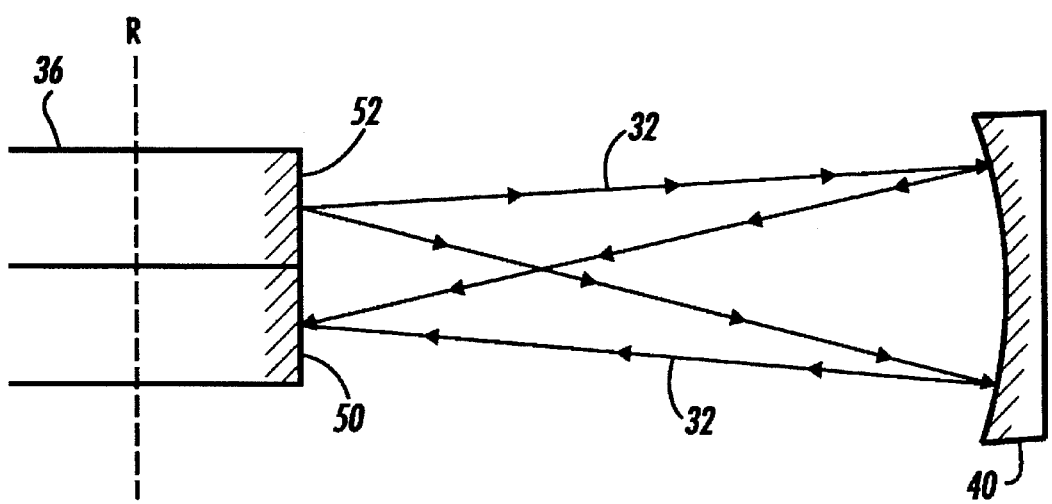
FIG. 7 is a schematic illustration of a cross-section side view in the sagittal plane of the single element optics for the passive facet tracking system of FIG. 2.

The single toroidal mirror 40 performs all the optical functions for double bounce passive facet tracking as illustrated in FIGS. 6 and 7. The toroidal mirror 40 has a focal length, $F_r$, in the tangential plane and a focal length, $F_s$, in the sagittal plane. The tangential focal length, $F_r$, is twice the sagittal focal length, $F_s$. The toroidal mirror is optically midway between the convex facet 52 and the flat facet 50. However, since the actual optical design is folded, the toroidal mirror is a distance equal to the tangential focal length, $F_r$, away from the adjacent facets 50 and 52.

The light beam 32 is focussed in both the sagittal plane and the tangential plane at the first convex facet 52 of the dual mirror motor polygon assembly 36.

In the tangential plane as illustrated in FIG. 6, the focussed light beam 32 reflects from the convex facet 52 and diverges the $F_t$ distance to the the facet tracking optics of the toroidal mirror 40. The diverging light beam 32 is reflected and collimated by the toroidal mirror 40. This collimated light beam is reflected to the flat facet 50. This collimated beam tracks the flat facet 50, as it rotates to provide a scan of one line.

In the sagittal plane, the focussed light beam 32 reflects from the convex facet 52 and diverges the $F_r$ distance (which is equal to 2 $F_s$) to the the facet tracking optics of the toroidal mirror 40. The diverging light beam 32 is reflected and focussed by the toroidal mirror 40. This light beam is reflected and focussed to the flat facet 50. This focussed beam tracks the flat facet 50. Mirror 40 is tilted slightly in the sagittal plane to allow the laser beam 32 to deflect to the flat facet 50 upon its return to the motor polygon assembly 36. The light beam 32 will then be reflected by the flat facet 50 at an angle normal to the axis of rotation R of the dual mirror motor polygon assembly 36 towards post scanning optics and a photoreceptor (not shown).

Figure 8:
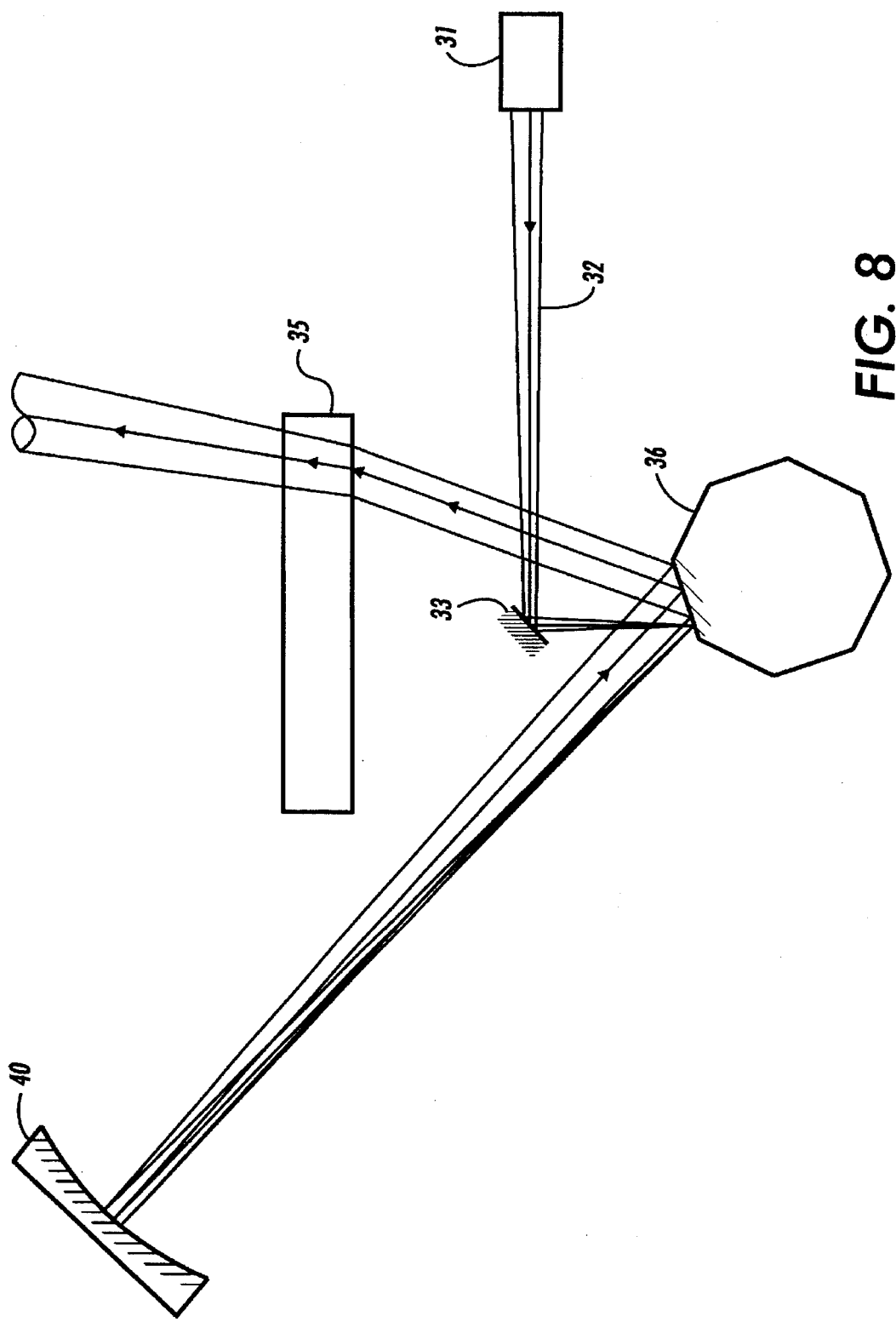
FIG. 8 is a schematic illustration of a cross-section side view of the single element optics for the passive facet tracking system of FIG. 2 used in a laser scanning system.

FIG. 8 shows the passive facet tracking system used in a laser scanning system including a light source 31 and fold mirror 33 to direct the beam 32 to the dual mirror motor polygon assembly 36. It is from the flat facets 50 of the dual mirror motor polygon assembly 36 that the beam 32 is reflected to post scanning optics 35. With the beam 32 focussed onto the flat facet 50 in the sagittal plane, it is possible to include standard wobble correction optics in the post scanning optics which allows for a relaxation of pyramidal polygon and bearing wobble manufacturing tolerances. By sagittally imaging facets of one polygon mirror to facets of the other polygon mirror in the dual mirror motor polygon assembly 36, wobble in the first polygon is also corrected by the standard wobble correction optics. Additionally the beam 32 returns to the dual mirror motor polygon assembly 36 at an angle that is normal to the flat facets 50 in the sagittal plane. As the beam 32 is scanned by the dual mirror motor polygon assembly 36, it remains in this normal plane, essentially preventing scan line bow.

In the tangential plane, the laser beam 32 is collimated at the flat facet 50. The collimation of the laser beam in the tangential plane allows a relaxation of polygon radius variations between individual facets.

The facet tracking optics is a toroidal mirror 40 with curvature in the tangential plane and with different curvature in the sagittal plane. The toroidal mirror 40 is located optically midway between the facets 50 and 52, resulting in a completely symmetric design. The focussed beam in the tangential plane at the convex facet 52 will return from the toroidal mirror 40 as a collimated beam at the flat facet 50. The focussed beam in the sagittal plane at the convex facet 52 will return from the toroidal mirror 40 as a focused beam at the flat facet 50.

The optics for a double bounce passive facet tracking optical scanning system in this present invention are a single element, a toroidal mirror. In the prior art, a spherical lens or a triplet lens were combined with a cylindrical mirror for the passive facet tracking optics. The toroidal mirror provides a totally reflective optical system. The toroidal mirror avoids lens aberrations to the beam and loss of power by transmitting the beam through a lens. Furthermore, the use of a toroidal mirror avoids problems in precisely positioning the lens in the optical path of the beam.

The toroidal mirror of the present invention is an optical element. However, the toroidal mirror may be a reflective binary diffractive optical element (as taught in U.S. Pat. No. 4,846,552, herein incorporated by reference) or other (non-binary) reflective diffractive optical element.

Although the passive facet tracking optical system system of the present invention was described with reference to a single beam system, it can be used with multiple beam systems.

While the present invention will be described in connection with a preferred embodiment and method of use, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A passive facet tracking system comprising:
   A) a dual mirror rotating polygon having an axis of rotation and two facets, one facet located above the other in a direction which is along the axis of rotation, one of said facets being a flat facet and the other of said facets being a convex facet,
   B) a toroidal mirror,
   C) said polygon and said toroidal mirror being so constructed and arranged relative to each other for said polygon convex facet to reflect a beam along a first path to said toroidal mirror, said toroidal mirror receiving the beam reflected from said polygon convex facet and reflecting the beam through a second path to said polygon flat facet, and said polygon flat facet reflecting the beam received from said toroidal mirror in a post scan direction, and D) said toroidal mirror being so constructed to collimate the beam, which has been focussed on said polygon convex facet, in a tangential plane after reflection from said polygon convex facet along the first path and after reflection from said toroidal mirror along the second path so that the beam is collimated in the tangential plane when it arrives at said polygon flat facet and said toroidal mirror being so constructed to focus the beam, which has been focussed on said polygon convex facet, in the sagittal plane after reflection from said polygon convex facet along the first path and after reflection from said toroidal mirror along the second path so that the beam is focussed in the sagittal plane when it arrives at said polygon flat facet.

2. The passive facet tracking system of claim 1 wherein said toroidal mirror is a reflective diffractive optical element.

3. The passive facet tracking system of claim 1 wherein the focal length in the tangential plane of said toroidal mirror is twice the focal length in the sagittal plane of said toroidal mirror.

4. The passive facet tracking system of claim 3 wherein said toroidal mirror is a distance equal to the focal length in the tangential plane of said toroidal mirror from said convex facet and said flat facet.

5. A scanning system comprising:

A) a light source for providing a light beam,

B) focussing means for focussing the light beam,

C) post scan lens means,

D) a scanning medium,

E) passive facet tracking means comprising:

i) a dual mirror rotating polygon having an axis of rotation and two facets, one facet located above the other in a direction which is along the axis of rotation, one of said facets being a flat facet and the other of said facets being a convex facet, ii) a toroidal mirror, iii) said polygon and said toroidal mirror being so constructed and arranged relative to each other for said polygon convex facet to reflect a beam along a first path to said toroidal mirror, said toroidal mirror receiving the beam reflected from said polygon convex facet and reflecting the beam through a second path to said polygon flat facet, and said polygon flat facet reflecting the beam received from said toroidal mirror in a post scan direction, and iv) said toroidal mirror being so constructed to collimate the beam, which has been focussed on said polygon convex facet, in a tangential plane after reflection from said polygon convex facet along the first path and after reflection from said toroidal mirror along the second path so that the beam is collimated in the tangential plane when it arrives at said polygon flat facet and said toroidal mirror being so constructed to focus the beam, which has been focussed on said polygon convex facet, in the sagittal plane after reflection from said polygon convex facet along the first path and after reflection from said toroidal mirror along the second path so that the beam is focussed in the sagittal plane when it arrives at said polygon flat facet, F) said light source, focussing means, and passive facet tracking means so constructed and arranged such that the light beam from the light source will be focussed on the polygon convex facet, and G) said passive facet tracking means, post scan lens means, and scanning medium so constructed and arranged such that the beam reflected in the post scan direction passes through said post scan lens means and is received by said scanning medium.

6. The passive facet tracking system of claim 5 wherein said toroidal mirror is a reflective diffractive optical element.

7. The passive facet tracking system of claim 5 wherein the focal length in the tangential plane of said toroidal mirror is twice the focal length in the sagittal plane of said toroidal mirror.

8. The passive facet tracking system of claim 7 wherein said toroidal mirror is a distance equal to the focal length in the tangential plane of said toroidal mirror from said convex facet and said flat facet.

* * * * *